United States Patent
Walker et al.

[19]

[11] Patent Number: 5,943,201
[45] Date of Patent: Aug. 24, 1999

[54] METHOD AND APPARATUS FOR SETTING TRIP PROFILES IN ELECTRICAL SWITCHES USING A PORTABLE UNIT WITH A NON-VOLATILE MEMORY

[75] Inventors: Christopher G. Walker, Coraopolis; James I. Wise, Cranberry, both of Pa.

[73] Assignee: Eaton Corporation, Cleveland, Ohio

[21] Appl. No.: 08/905,908

[22] Filed: Aug. 4, 1997

[51] Int. Cl.$^6$ .................................................... H02H 3/00
[52] U.S. Cl. ............................................. 361/64; 361/97
[58] Field of Search .................................... 361/62–64, 66, 361/76, 43, 99, 93–97; 364/528.27, 528.28; 340/638

[56] References Cited

U.S. PATENT DOCUMENTS

| | | | |
|---|---|---|---|
| 4,751,605 | 6/1988 | Mertz et al. | 361/91 |
| 4,958,252 | 9/1990 | Murphy | 361/93 |
| 5,101,316 | 3/1992 | Levain | 361/93 |
| 5,247,454 | 9/1993 | Farrington et al. | 364/483 |
| 5,488,338 | 1/1996 | Seymour et al. | 335/202 |
| 5,596,473 | 1/1997 | Johnson et al. | 361/97 |

*Primary Examiner*—Jeffrey Gaffin
*Assistant Examiner*—Kim Huynh
*Attorney, Agent, or Firm*—Martin J. Moran

[57] ABSTRACT

Trip profiles for electrical switches such as circuit breakers and overload relays can be generated, and when appropriate, coordinated, in a remote processor such as a personal computer. The profiles, with the addresses of the associated electrical switches are transferred into non-volatile memory in a portable unit. This portable unit is transported to the site of the electrical switches where it is interfaced with the appropriate electrical switch for loading of the assigned profile into the switch. In addition, the profiles stored in the electrical switches can be loaded into the portable unit for transport back to the remote unit for verification and/or modification.

7 Claims, 2 Drawing Sheets

5,943,201

METHOD AND APPARATUS FOR SETTING TRIP PROFILES IN ELECTRICAL SWITCHES USING A PORTABLE UNIT WITH A NON-VOLATILE MEMORY

BACKGROUND OF THE INVENTION

1. Field of the Invention

This invention relates to electrical switches such as circuit breakers and overload relays having trip profiles, and more particularly, to apparatus and a method for setting and reading the trip profiles using a portable unit.

2. Background Information

Electrical switches of the types such as circuit breakers and overload relays respond to a set of parameters characterizing current flowing through the switch known as trip profiles to automatically open the switch. In state of the art electrical switches, the trip profiles are implemented by a microprocessor which stores the characterizing parameters in a memory. These trip profiles are established by setting values for the characterizing parameters. Typically, this is performed by a set of switches on the electrical switch. In some cases, rather than having a set of switches on each electrical switch, a portable unit is temporarily connected to the circuit breaker and the profile is set by switches on the portable unit. In some installations, such as for instance in a plant power distribution system, each of the electrical switches, is connected to a remote personal computer which can set the trip profiles remotely.

The trip profiles of state of the art circuit breakers have become quite complex, thereby requiring a certain level of skill and attention to setting them correctly. This is particularly important in systems where the trip profiles of the various switches are coordinated. For instance, in an electric power distribution system the trip profiles of circuit breakers lower in the hierarchy of the distribution system are set so that those circuit breakers will respond before circuit breakers higher up in the hierarchy to thereby isolate a fault as much as possible. The coordination of the trip profiles is performed by a skilled engineer, typically remotely from the distribution system. The various parameters establishing the trip profiles are then taken to the field where they are inserted by other less skilled individuals. This manual setting of the trip profiles is susceptible to human errors, and is otherwise time consuming.

There is a need for an approved apparatus and method for setting trip profiles in electrical switches such as circuit breakers and overload relays, and particularly those controlled by microprocessors.

There is a further need for such an improved method and apparatus which improves the integrity of setting the trip profiles in such electrical switches.

There is yet another need for such an apparatus and method which reduces the time in the field required to set the trip profiles.

There is yet another need for such an apparatus and method which reduces the level of skill required to reliably set the trip profiles in the field.

There is still another need for such an apparatus and method which simplifies and assures the integrity of coordinated trip profiles.

There is a further need for having available a reliable record of trip settings for resetting after breaker maintenance or replacement.

SUMMARY OF THE INVENTION

These needs and others are satisfied by the invention which is directed to apparatus and a method for setting and reading trip profiles in electrical switches such as circuit breakers and overload relays. A portable unit which is temporarily interfaced with the electrical switch contains a non-volatile memory in which trip profiles are stored. The portable unit is interfaced with the electrical switch through communication means in the switch using the unique address assigned to the switch. The profiles can be generated remotely from the switch by a remote processor such as a personal computer. The portable unit is temporarily connected with the remote processor for uploading of the trip profiles, together with the associated addresses, into the non-volatile memory of the portable unit. The portable unit is then transported to the location of the electrical switch for uploading into the trip unit of the switch identified by the unique address associated with each profile. This arrangement provides a reliable, efficient way of assuring that the proper trip profile is entered into each of the switches. This is particularly important where the trip profiles are coordinated, such as in an electric power distribution system.

The portable unit can also be utilized to download trip profiles from the electrical switches for transport to a remote processor for verification and for modification. The modified trip profiles can then be transported in the non-volatile memory of the portable unit back to the electrical switch for upload.

In particular, the invention includes the combination of at least one electrical switch having trip means tripping the separable contacts open in response to currents which exceed an assigned trip profile comprising a set of parameter settings, and communication means for transmitting and receiving messages incorporating the assigned trip profile. The combination further includes a portable unit separate from the switch and having non-volatile memory means for storing a plurality of trip profiles, and interface means for temporarily interfacing the portable unit with the communication means in the electrical switch. The portable unit further includes processor means for controlling transfer of the trip profiles in at least one direction between the trip means and the non-volatile memory through the interface means in the portable unit and the communication means in the switch. Where there are a plurality of switches, the communication means incorporates a unique address for the switch and the non-volatile memory of the portable unit stores an address with each profile. The combination further includes a remote processor having means generating the profiles with the unique addresses and means temporarily connecting the portable unit to the remote processor for transferring trip profiles with their associated addresses between the remote processor and the non-volatile memory of the portable unit. The invention also embraces the method of setting and reading trip profiles in electrical switches.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to an electric power distribution system in which the electrical switches are circuit breakers. However, it will be understood by those skilled in the art that the invention has application to other types of systems incorporating electrical switches with intelligence and a communications system with which it can interface with the invention.

Figure 1:
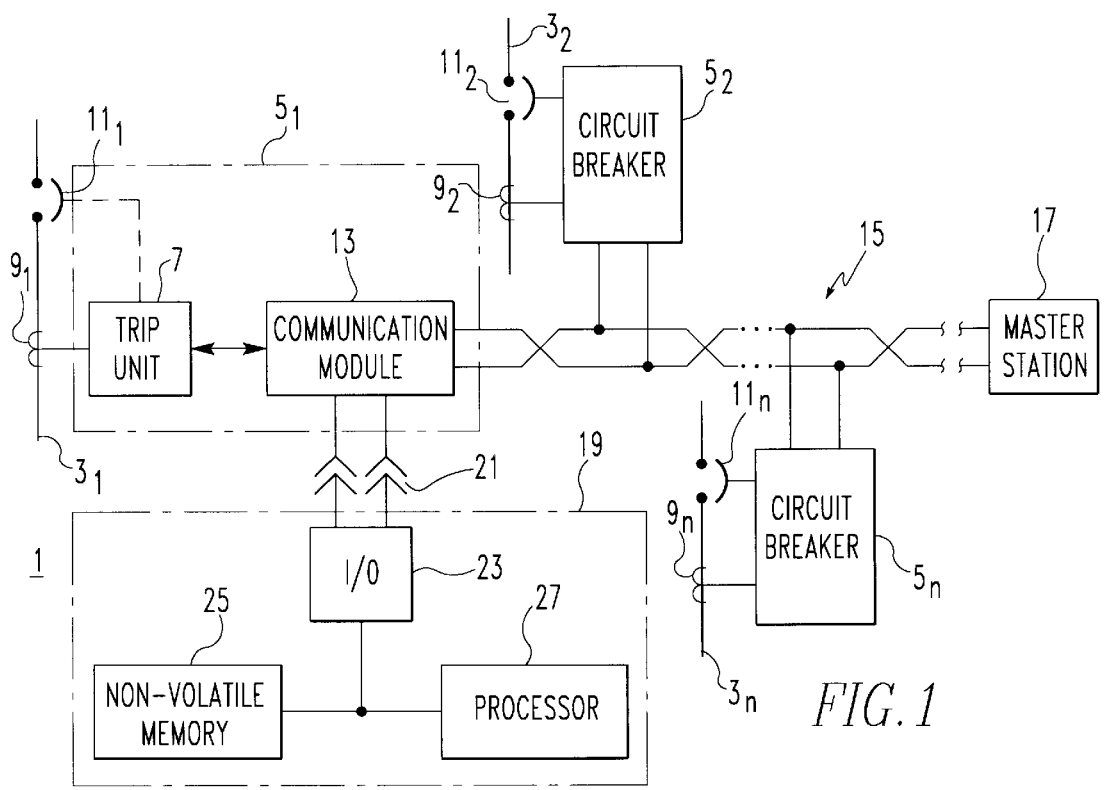
FIG. 1 is a schematic diagram of an electric distribution system incorporating the invention and in particular showing a portable unit connected to a circuit breaker in the distribution system.

As shown in FIG. 1, the electrical distribution system 1 includes a number of branches $3_1$, $3_2$, to $3_n$ each protected by a circuit breaker $5_1$, $5_2$, to $5_n$. Each of circuit breakers 5 has a trip unit 7 which monitors current flowing in the associated branch 3 and sensed by a current transformer (CT) $9_1$ to $9_n$. The trip unit has stored therein a trip profile which is defined by a number of parameter settings, including the current sensed by the CTs 9. When a current exceeds the values determined by the trip profile, the affected circuit breaker trips, thereby opening separable contacts $11_1$, to $11_n$ to interrupt to enter the current flowing in the associated branch 3.

The circuit breakers $5_1$, to $5_n$ each also include a communications module 13 which interfaces the circuit breaker with a network 15. The network 15 includes a master station 17. Typically, the network operates in a master/slave mode with the master station serving as the master and the circuit breakers 5 operating in the slave mode. In this arrangement, each of the circuit breakers 5 has an assigned, unique address so that the master station 17 can transmit messages directed only to a selected circuit breaker. The circuit breaker can then respond by sending a message which includes its unique address. Such an arrangement is described in U.S. Pat. No. 5,596,473 which is hereby incorporated by reference.

In accordance with the invention, a hand held, portable unit 19 can be interfaced with the communications module 13 in a particular circuit breaker 5 through a plug-in connector 21 and an input/output (I/O) unit 23 in the portable unit 19. The portable unit further includes a non-volatile memory 25 and processor 27 as described in U.S. Pat. No. 5,596,473. When the portable unit 19 is plugged into the circuit breaker 5, the communications module 13 is disconnected from the network 15 and instead responds to messages from and returns messages to the portable unit 19. The non-volatile memory 25 in the portable unit 19 stores a plurality of trip profiles. The user can select a profile, in a manner to be discussed, for uploading into the trip unit of the circuit breaker to which the portable unit is connected. In this arrangement, the same trip profile can be uploaded into a number of the circuit breakers 5. In another form of the invention, the unique address of one of the circuit breakers is associated with each profile so that an assigned profile is uploaded to the correct circuit breaker. In this latter arrangement, the portable unit can be used to read the address of the circuit breaker to which it is interfaced so that the correct profile can be selected from the non-volatile memory. The portable unit 19 can also be used to download the profile in the trip unit of the circuit breaker to which it is connected for purposes to be discussed. Such downloaded profiles are stored with the address of the circuit breaker from which the profile was obtained for later identification.

The portable unit 19 can be transported to the site of a remote processor 29, such as a personal computer (PC), and interfaced through the connector 21 and a communications port 31 in the PC. The trip profiles which are uploaded by the portable unit 19 into the various circuit breakers 5 can be generated in the remote processor 29. This remote processor can be the personal computer of the skilled engineer who determines the parameter settings for the various trip profiles. As is known, the trip profiles for the circuit breakers 5 in a hierarchial distribution system can be coordinated so that the circuit breaker closest to a fault in the distribution system trips first, and therefore limits disruption of the distribution system 1. The addresses of the circuit breakers to which the various trip profiles are assigned are loaded into the non-volatile memory in the portable unit 19 by the remote processor 29. A semi-skilled worker can then transport the portable unit 19 to the site of the distribution system for uploading of the profiles into the different circuit breakers 5. As the addresses of the circuit breakers are associated with the profile, the risk of uploading the profile into the wrong circuit breaker is virtually eliminated. Also, since the uploading is automatic, it is rapid and avoids errors in entry. As another aspect of the invention, the trip profiles in the circuit breaker can be downloaded into the portable unit, transported to the site of the remote processor 29, and uploaded for verification with a master table stored in the remote processor. These profiles can also be modified as necessary and returned for uploading into the circuit breakers 5. Since the portable unit 19 has a non-volatile memory, it can be used for long-term storage of the assigned trip profiles which may be recalled for uploading to a replacement circuit breaker or to otherwise reprogram a circuit breaker in the field.

Figure 2:
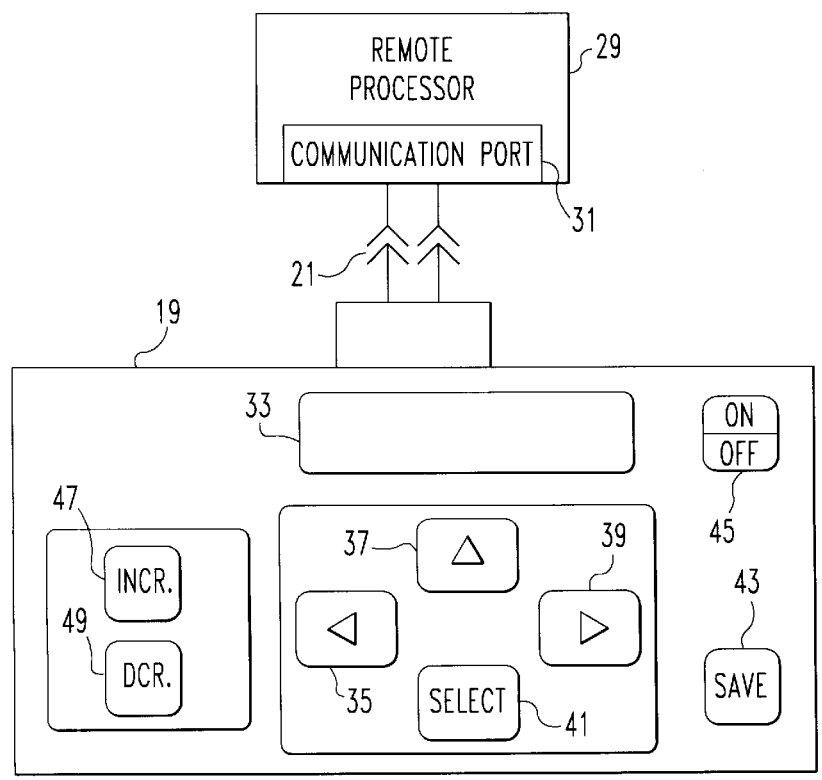
FIG. 2 illustrates connection of the portable unit in accordance with the invention to a remote processor such as a personal computer.

As shown in FIG. 2, the portable unit 19 has a 16 character display 33 which presents a menu of available functions including selection of uploading and downloading of trip profiles. This menu may be scrolled by membrane switches 35, 37 and 39. A selected function is implemented by pressing the "select" membrane switch 41. A "save" button 43 can be used in conjunction with the "select" button 41 to confirm certain actions such as deleting a profile. The portable unit 19 is powered up or down by the "on/off" button 45. An increase button 47, and a decrease button 49, are used for performing other unrelated functions in the portable unit 19.

Figure 3:
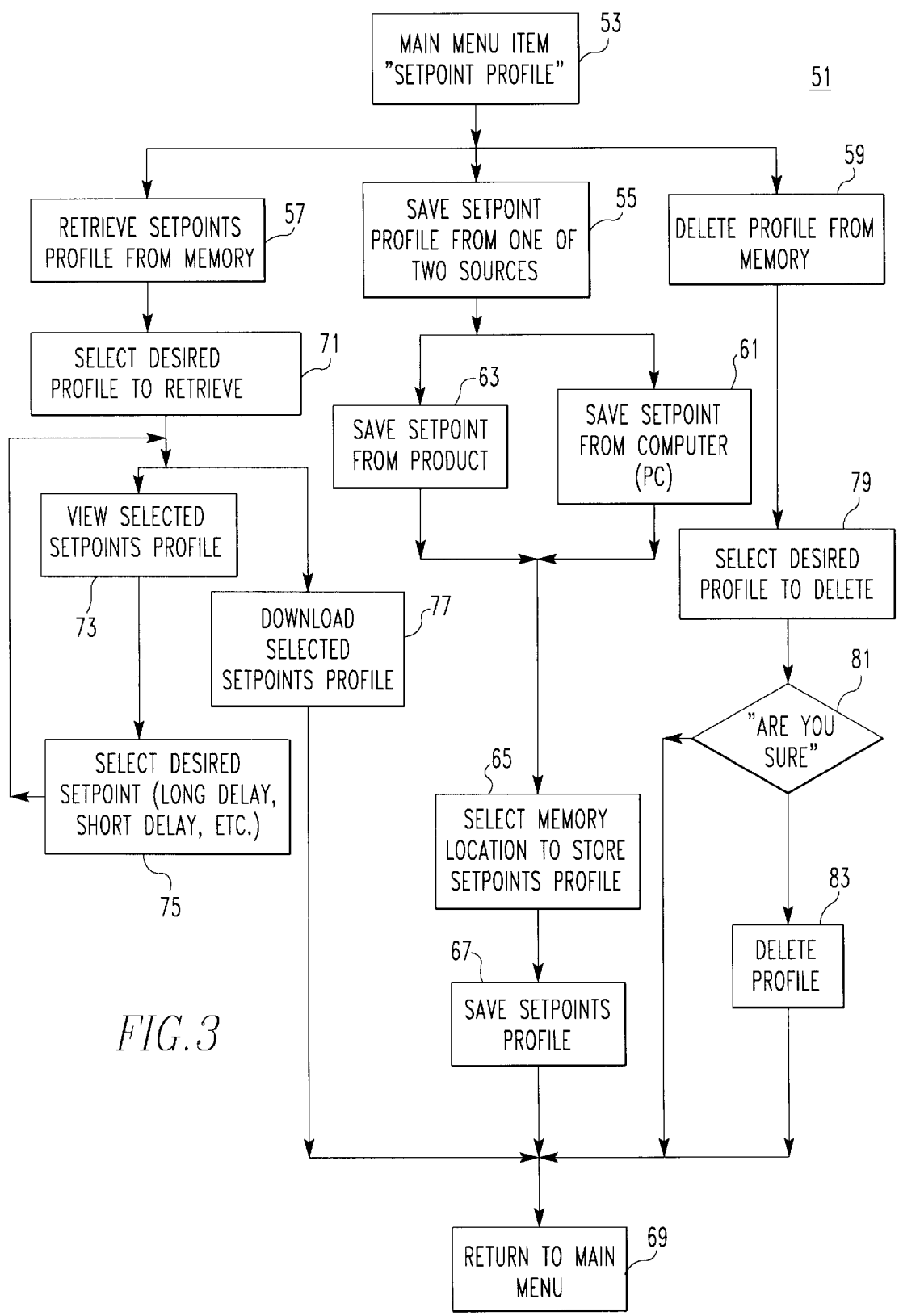
FIG. 3 is a flow chart illustrating operating of the portable unit in accordance with the invention.

FIG. 3 is a flow chart 51 of the operation of the portable unit 19. The "set point profile" is selected at 53 from the main menu presented on the display 33. This produces a new display which prompts the user to either select from the set point profiles stored in the non-volatile memory 25 or to save a set point profile to the memory 25. There are three submenus of the main menu item "set points profile." The first is a "save set points" menu 55, a second is a "retrieve set points" submenu 57, and the third is a "delete profile" submenu 59.

The "save set point" submenu 55 can save a profile to the non-volatile memory 25 by either downloading a profile developed on the remote processor at 61 or by retrieving a profile from a trip unit previously programmed at 63. If the "save from computer" option is selected at 61, a specified circuit breaker address is normally required. If the trip profile is saved from a circuit breaker, the address of the circuit breaker will be retained with the profile in the memory 25. In either case, an available location in the non-volatile memory 25 is determined at 65 and the profile is saved at 67 before the program returns to the main memory at 69. The "retrieve set points" 57 function is used to read profiles from the non-volatile memory 25 of the portable unit that were previously downloaded either from the remote processor 29 or a trip unit 7 of a circuit breaker 5. Once the "retrieve set points profile" has been selected, a list of profiles designated as P1, P2 . . . Pn are displayed on the display 33. The selection of a profile is performed by moving a cursor with the "right" button 39 or "left" button 35. The "select" button 41 is then pressed simultaneously with the "save" button 43 to select a profile. Upon successful retrieval of a profile, the portable unit will display that the profile selected has been retrieved. It may be desirable to view the set point settings of the profile as indicated at 73. In order to display the settings in terms of current, an artificial rating plug and frame value needs to be entered. The user can be prompted to do this on the display 33 and can adjust the settings using the increase and decrease buttons 47 and 49. The view profile submenu 73 allows the user to view the address of the trip unit that the portable unit saved the profile from or the address that the profile was saved at by the remote processor. This address may be edited if a password is entered.

The selected profile is downloaded at 77 by simultaneously pressing the "save" button 43 and the "select" button 41. A message "downloading profile PX to (address)" is displayed on the display 33. When the download is complete, the program returns to the main menu at 69.

If a profile is no longer needed, it may be desirable to delete it from the non-volatile memory 25. As mentioned, this can be accomplished through the "delete profiles" submenu at 59 under the main menu item "set points profiles." A listing of all of the profiles that have been saved will be displayed by pressing the "save" 43 and "select" 41 buttons. A cursor will flash on the first saved profile designation such as P1 or P2. By moving the cursor with the "right" button 39 or "left" button 35, the various profile designators are displayed. With the cursor on the profile to be deleted, the "save" button 43 and the "select" button 41 are pressed simultaneously at 79. A message "Are you sure?" will be displayed at 81. The message "No" will appear in the bottom right hand corner of the display 33. By pressing the "up" button 37, the word "Yes" will toggle into the lower right screen. Then by simultaneously pressing the "save" 43 button and the "select" button 41 the selected profile is deleted at 83.

The set up of circuit breaker set points during installation can be time consuming and sometimes confusing to the technician or engineer. By pre-determining the various set points in a trip profile on a remote processor, such as a PC, and downloading them to the portable unit 19, little time is spent in the field setting up circuit breaker trip profiles, and erroneous coordination is virtually eliminated. Using a personal computer with a communications module, the trip profiles, which are configured using Windows or DOS compatible software, can be downloaded to the portable unit. Several circuit breaker profiles can be stored in the portable unit and then downloaded to the circuit breakers in the field. The upload feature allows the portable unit to return profiles to the personal computer as well. These advantages provided by the invention save time, but most importantly, improve the accuracy of setting up profiles in electrical switching apparatus such as circuit breakers, overload relays and the like.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. In combination:

electrical switch means comprising at least one electrical switch having separable contacts, trip means tripping said separable contacts open in response to currents through said separable contacts which exceed an assigned trip profile comprising a set of parameter settings, and communication means for transmitting and receiving messages incorporating said assigned trip profile;

means separate from said electrical switch means comprising a portable unit having non-volatile memory means for storing at least one trip profile, interface means for temporarily connecting said portable unit with said communication means in said at least one electrical switch, and processor means for controlling transfer of trip profiles in at least one direction between said trip means and said non-volatile memory means through said interface means;

wherein said electrical switch means comprises a plurality of electrical switches, each including separable contacts, trip means responsive to an assigned trip profile, and communication means having a unique address identifying said electrical switch, wherein said non-volatile memory stores each of said profiles with one of said unique addresses, and wherein said processor means determines the unique address of an electric switch to which said portable unit is interfaced and transfers a profile with that unique address; and wherein said means separate from said electrical switch means further includes a remote processor having means generating said trip profiles with said unique addresses, and means temporarily interfacing said portable unit with said remote processor for transferring to said non-volatile memory said trip profiles with said addresses for subsequent transfer to said electrical switches.

2. In combination:

electrical switch means comprising at least one electrical switch having separable contacts, trip means tripping said separable contacts open in response to currents through said separable contacts which exceed an assigned trip profile comprising a set of parameter settings, and communication means for transmitting and receiving messages incorporating said assigned trip profile;

means separate from said electrical switch means comprising a portable unit having non-volatile memory means for storing at least one trip profile, interface means for temporarily connecting said portable unit with said communication means in said at least one electrical switch, and processor means for controlling transfer of trip profiles in at least one direction between said trip means and said non-volatile memory means through said interface means;

wherein said electrical switch means comprises a plurality of electrical switches, each including separable contacts, trip means responsive to an assigned trip profile, and communication means having a unique address identifying said electrical switch, wherein said non-volatile memory stores each of said profiles with one of said unique addresses, and wherein said processor means determines the unique address of an electric switch to which said portable unit is interfaced and transfers a profile with that unique address;

wherein said interface means includes means transferring from said electrical switch to said non-volatile memory a trip profile in said electrical switch together with said unique address of said electrical switch; and wherein said means separate from said electrical switch means further includes a remote processor having means generating said trip profiles with said unique addresses and means temporarily interfacing said portable unit with said remote processor for transferring to said non-volatile memory trip profiles with said unique addresses for subsequent transfer to said electrical switches and for transferring said trip profiles with said unique addresses in said non-volatile memory to said remote processor.

3. A method of setting a trip profile in an electrical switch comprising the steps of:

generating a trip profile;

storing said trip profile in a non-volatile memory of a portable unit;

establishing a temporary interface between said portable unit and said electrical switch;

transferring said trip profile from said non-volatile memory in said portable unit to said electrical switch through said temporary interface;

setting trip profiles for a plurality of electrical switches each having a unique address wherein said step of generating comprises generating a trip profile for at least one of said plurality of electrical switches together with said unique address of said at least one electrical switch; storing said unique address with said trip profile in said non-volatile memory; and transferring said trip profile to said at least one electrical switch with said unique address;

wherein said step of generating comprises generating trip profiles for a plurality of said electrical switches each with a unique address; storing each of said profiles with said unique address in said non-volatile memory; and transferring said trip profiles with said unique addresses to said electrical switches having said unique addresses;

wherein said step of generating trip profiles for plurality of said electrical switches comprises generating trip profiles which coordinate tripping of said plurality of electrical switches; and wherein said trip profiles which coordinate tripping are generated in a remote processor and transferred from said remote processor to said non-volatile memory in said portable unit.

4. A method of setting a trip profile in an electrical switch comprising the steps of:

generating a trip profile;

storing said trip profile in a non-volatile memory of a portable unit;

establishing a temporary interface between said portable unit and said electrical switch;

transferring said trip profile from said non-volatile memory in said portable unit to said electrical switch through said temporary interface; and wherein said step of generating comprises generating said trip profile in a remote processor and wherein said step of storing comprises establishing a temporary interface between said remote processor and said portable unit and transferring said trip profile from said remote processor to said non-volatile memory in said portable unit.

5. The method of claim 4, further comprising downloading said trip profile in said electrical switch through said temporary interface to said non-volatile memory in said portable unit, and subsequently downloading said trip profile from said non-volatile memory in said portable unit to said remote processor.

6. The method of claim 4, adapted for setting trip profiles in a plurality of electrical switches each having a unique address wherein said step of generating comprises generating in said remote processor trip profiles for said plurality of electrical switches with each of said trip profiles tagged with the unique address of one of said electrical switches, wherein said storing step includes storing said plurality of trip profiles with said unique addresses in said non-volatile memory of said portable unit and wherein said step of transferring comprises transferring said trip profiles to the electrical switches having a corresponding unique address.

7. The method of claim 6, wherein said step of generating said trip profiles comprises generating trip profiles in said remote processor which coordinate tripping of said plurality of electrical switches.

\* \* \* \* \*